May 30, 1939.    F. W. SCHWINN    2,160,034
BICYCLE SPRING FORK MECHANISM
Filed March 3, 1938    5 Sheets-Sheet 1

Fig. 1.

Inventor:
Frank W. Schwinn
By
Williams, Bradbury, McCaleb & Hinkle
Attys.

May 30, 1939.  F. W. SCHWINN  2,160,034

BICYCLE SPRING FORK MECHANISM

Filed March 3, 1938  5 Sheets-Sheet 2

Inventor
Frank W. Schwinn
By Williams, Bradbury,
McCaleb & Hinkle
Attys.

May 30, 1939.  F. W. SCHWINN  2,160,034
BICYCLE SPRING FORK MECHANISM
Filed March 3, 1938  5 Sheets-Sheet 3
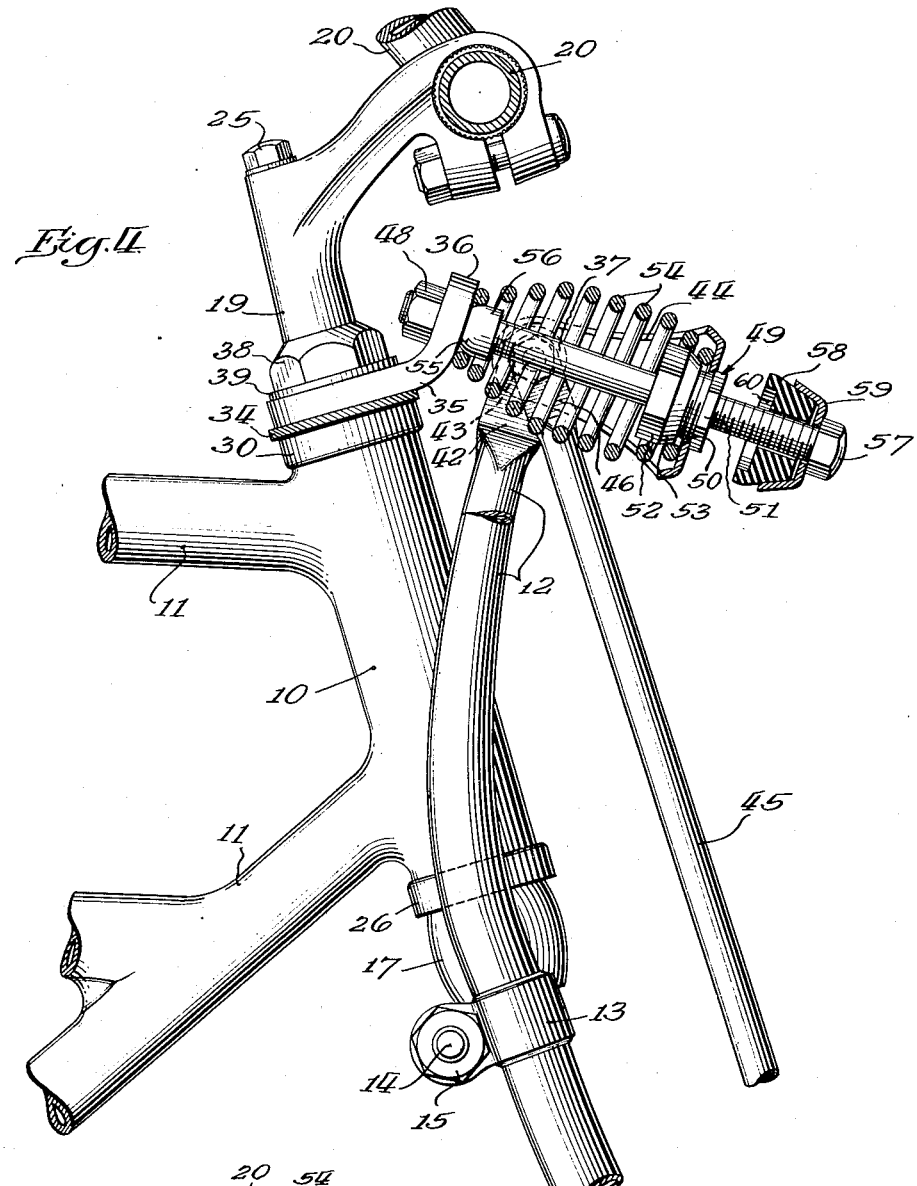
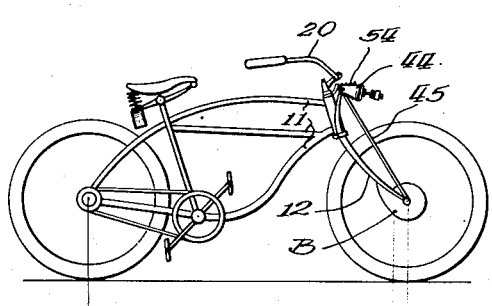
Inventor:
Frank W. Schwinn
By Williams, Bradbury, McCaleb & Hinkle
Attys May 30, 1939.  F. W. SCHWINN  2,160,034
BICYCLE SPRING FORK MECHANISM
Filed March 3, 1938  5 Sheets-Sheet 4
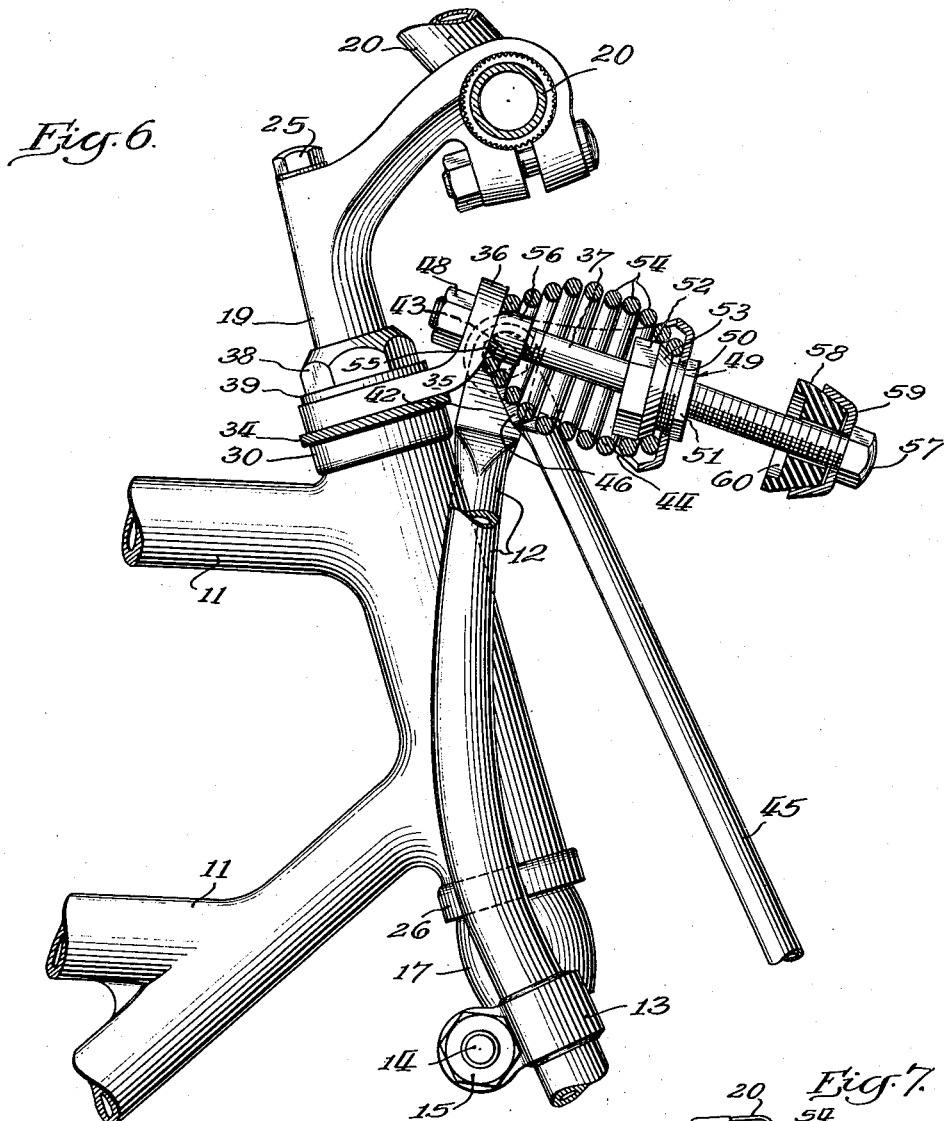
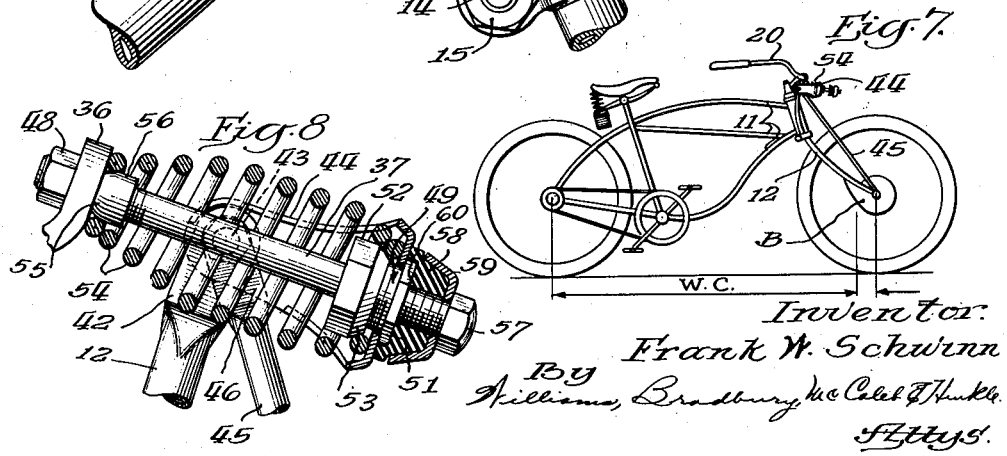

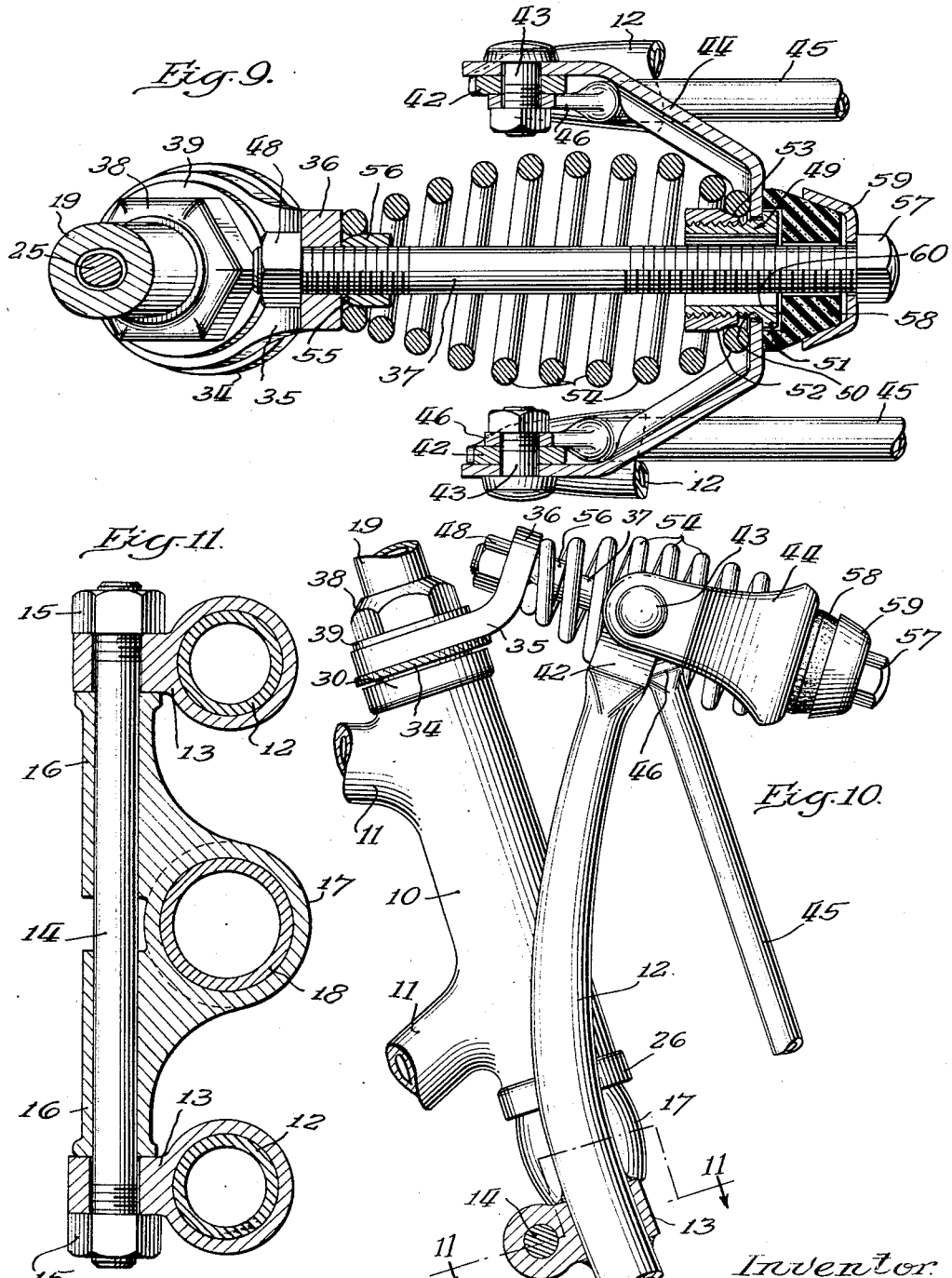

Patented May 30, 1939

2,160,034

UNITED STATES PATENT OFFICE 2,160,034

BICYCLE SPRING FORK MECHANISM

Frank W. Schwinn, Chicago, Ill.

Application March 3, 1938, Serial No. 193,678

3 Claims. (Cl. 280—276)

My invention contemplates and provides an improved spring fork mechanism for bicycles.

One of the objects of the present invention is to provide a spring fork mechanism which is particularly suitable for incorporation in a bicycle which is also provided with means for effecting front wheel braking.

Another object of the invention is to provide a bicycle spring fork mechanism in which the inertia of the bicycle frame and rider is resiliently counteracted and cushioned, pursuant to braking effected at the front wheel, in such a way as very largely to eliminate vibratory movements, of spring fork and bicycle frame, detrimental to smooth and effective braking or tending to disturb the balance of the bicycle rider.

Another object of the invention is so to construct the bicycle spring fork mechanism that the cushioning referred to in the last preceding paragraph is effected by a rubber button which is readily replaceable whenever its replacement is necessary or desirable.

Another object of the invention is to provide a spring fork mechanism which is suitable for incorporation in a bicycle provided with means for effecting independent braking on its two wheels, e. g., a bicycle provided with a coaster brake for the rear wheel and a fore-wheel brake controlled from the handle bar.

Another object of the invention is to provide a bicycle spring fork mechanism of novel, simple and rugged construction, which readily may be adjusted to accommodate bicycle riders of different weights.

Another object of the invention is to provide a spring fork mechanism which readily may be applied to any bicycle having a conventional steering head.

A further object of the invention is to provide a bicycle spring fork mechanism which is of good appearance and economical to manufacture.

In the accompanying drawings, wherein I have illustrated a preferred embodiment of my invention:

Fig. 1 is a view in perspective of the fore part of a bicycle embodying my improved spring fork mechanism;

Fig. 4 is a view largely in section and partly in elevation illustrating the positions assumed by the several elements of the spring fork mechanism when the bicycle is being ridden by a person of substantially the weight for which the spring fork mechanism has been adjusted;

Fig. 5 is another diagrammatic illustration, comparable with the illustration of Fig. 3, illustrating how the distance between wheel centers is increased under the weight of the rider;

Fig. 6 is a view generally similar to Fig. 4, but illustrating the positions assumed by the several parts of the spring fork mechanism when the bicycle, while being ridden, is being braked at the rear wheel, e. g., as with a conventional coaster brake not shown;

Fig. 7 is another diagrammatic illustration, comparable with those of Figs. 3 and 5, illustrating how the distance between wheel centers is still further increased when the several elements of the spring fork mechanism assume the relative positions depicted in Fig. 6;

Fig. 8 is a view partly in section and partly in elevation illustrating how the rubber cushioning button functions when, with the bicycle being ridden, the fore-wheel brake is applied;

Fig. 9 is an enlarged sectional view taken on the lines 9—9 of Figs. 1 and 2;

Fig. 10 is an elevational view with the parts of the spring fork mechanism in the positions illustrated in Fig. 2, and with portions thereof broken away to illustrate certain details; and Fig. 11 is an enlarged sectional view taken on the irregular line 11—11 of Fig. 10.

Similar characters of reference refer to similar parts throughout the several views.

Figure 2:
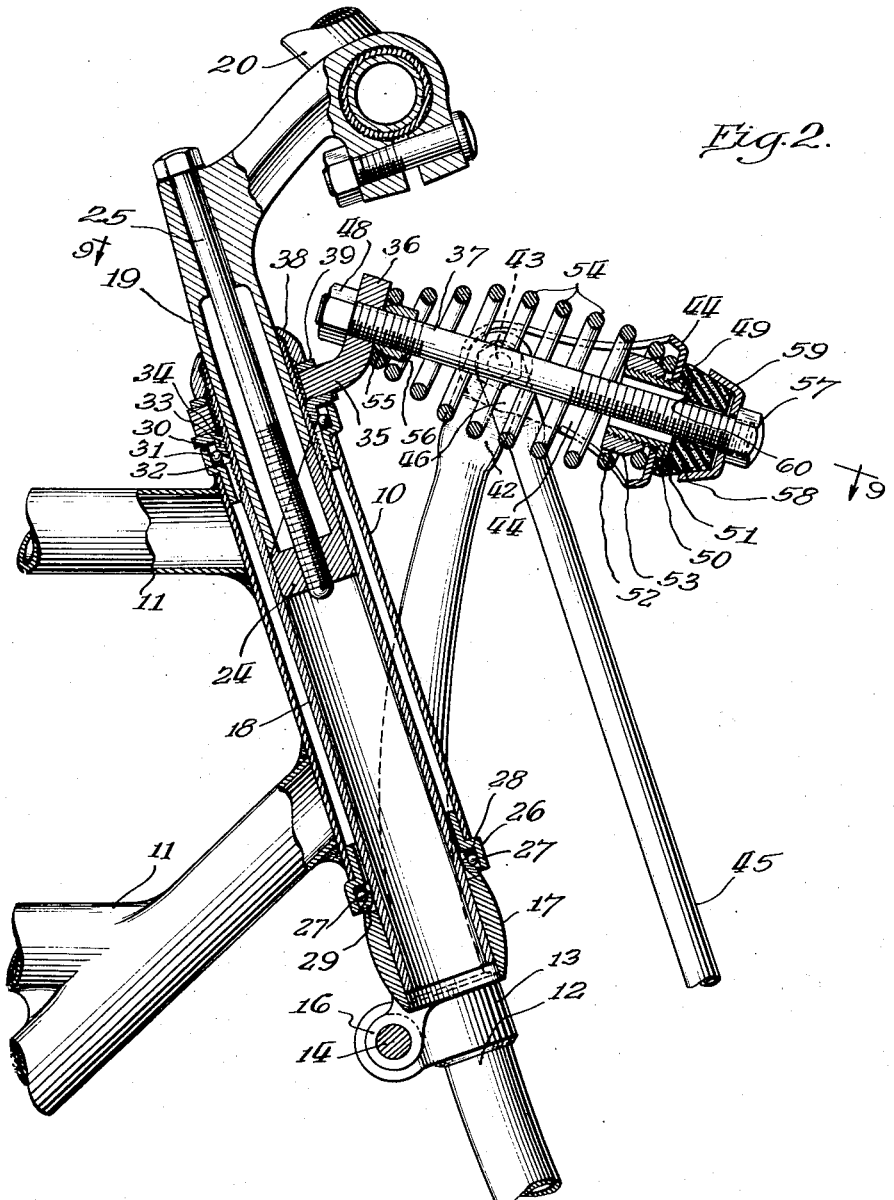
Fig. 2 is an enlarged vertical sectional view which may be regarded as taken in the plane of the line 2—2 of Fig. 1 and looking in the direction indicated by the arrows.

In the drawings reference character 10 indicates the steering head of the frame 11 of a bicycle which also comprises the usual wheels, saddle, handle bar, pedals, etc. As shown, the bicycle is provided with a fore-wheel brake B. It may be assumed that the bicycle also is provided with a conventional coaster brake (not shown).

The spring fork mechanism comprises the two tubular fork members 12, each of which at a point intermediate its ends (but substantially closer to its upper end than to its lower end) is welded or otherwise securely held in the embrace of the forward collar of a two collar fitting 13. The rear collar of each such fitting 13 has its axis at right angles to the axis of its associated fore collar. Such rear collar of each fitting 13 is pivotally mounted on one end of a bolt 14. The bolt 14 is threaded at each end for cooperation with a nut 15. The rear collar of each fitting 13 is disposed between one of such nuts 15 and one of two similar brackets 16 through which the bolt 14 extends. The brackets 16 are formed integrally with a rugged sleeve 17 which encircles and is welded or otherwise fixedly secured to the lower end of a steering tube or steering post 18. Tube 18 extends through the steering head 10 and the upper end of such tube receives the snugly fitting stem 19 of the handle bar 20. The handle bar, incidentally, preferably carries the hand lever 21 by which the fore-wheel brake B may be operated through the agency of a flexible connection of the Bowden type, i. e., one comprising a wire or fine cable 22 extending through and sliding in an elongated flexible sleeve 23. The details of the brake B, and its mode of operation, are not material to the present invention. Suffice it will to say that the front wheel of the bicycle may be braked by exerting pressure upon the hand lever 21.

The handle bar stem 19, as is usual in bicycles of my design, has a beveled lower end cooperating with the beveled upper end of a wedging member 24 acting as a nut for elongated bolt 25.

Steering tube 18 preferably is provided with upper and lower combination radial and thrust bearings. The lower one of these bearings comprises the sleeve 26 of two diameters, the series of balls 27, a suitable ball retainer of which portions are indicated at 28, and the bearing cone 29. The upper bearing comprises the sleeve 30 of two diameters, the series of balls 31, a ball retainer of which portions are shown at 32, and the bearing cone 33. Bearing cone 33 is an integral part of a ring nut 34, which has threaded engagement with the upper end of the steering tube 18.

Also encircling the upper end of the steering tube 18 is a rugged collar 35 which is provided with a forwardly projecting upwardly inclined lug 36 which is tapped for cooperation with the threads at one end of a cushion arbor 37 to which reference presently will be made. Collar 35 rests upon the ring nut 34 and is firmly clamped thereto by hex nut 38 and its associated washer 39. Consequently, collar 35 and its lug 36 move with the steering tube 18.

The lower ends of the fork members 12 are flattened, as at 40, and are apertured (or otherwise conformed) to receive the ends of the front wheel axle in the usual or any suitable manner. Incidentally, tht housing of fore-wheel brake B may be clamped to one of the fork members 12, as indicated at 41. (See Fig. 1.)

It will be noted that each of the fork members 12 is slightly bowed so that both its upper and lower extremities normally lie forward of a vertical plane which includes its horizontal axis afforded by the bolt 14, and that the upper extremity of each fork member 12 is flattened, as at 42, and is apertured for the reception of a short bolt 43, whereby it is secured to one leg of a generally U-shaped yoke 44. (See Fig. 9.)

Associated with each bowed fork member 12 is a brace rod or tube 45 which has its upper and lower ends flattened, as indicated at 46 and 47. The flattened upper end of each brace member 45 is apertured so that it may be secured to the U-shaped yoke 44 by the same short bolt 43 whereby the upper end of its associated fork member 12 is secured to such yoke. The flattened lower end of each brace member 45 is apertured so that it may receive that end of the front wheel axle which also extends through the flattened and apertured lower end of its associated fork member 12. (See Fig. 1.)

The cushion arbor 37, to which I have previously alluded, is provided with a lock nut 48 whereby to maintain any desired adjustment of such cushion arbor with respect to the collar lug 36 by which it is carried. It will be noted that the forward end of the cushion arbor, which is also threaded, extends through a sleeve 49 which in turn extends freely through an opening 50 in the forward or web portion of the U-shaped yoke 44. At its forward end the sleeve 49 is provided with a flange 51 which is conveniently hexagonal in shape and of such size that it will not pass through opening 50. The rear end of sleeve 49 is externally threaded for the reception of a nut 52 which has, as an integral part thereof, a conical retainer-seat 53 for the most forwardly convolution of a coiled compression spring 54 which is disposed around the cushion arbor 37 and has its most rearwardly convolution engaged by a conical retainer-seat 55 which is disposed immediately adjacent lug 36 and constitutes an integral part of a nut 56 which is threaded upon the cushion arbor 37 as shown.

Cushion arbor 37 extends forwardly and somewhat downwardly from lug 36 and is provided at its forward end with a cap nut 57. A wrench may be applied to this cap nut 57 when it is desired further to thread arbor 37 into lug 36 in adjusting the spring fork mechanism to meet the requirements of a relatively heavy rider. However, the principal function of cap nut 57 is removably to hold upon the forward end of the cushion arbor 37 the rubber button or frusto-conical cushion 58 and its frusto-conical cushion receiver-seat 59. Cushion receiver-seat 59 frictionally engages the frusto-conical surface of rubber button or cushion 58 normally to hold the latter coaxially with the cushion arbor 37, and out of engagement with the threads of the latter. Another function of the cushion receiver-seat 59 is to transmit to nut 57, and then to the cushion arbor 37, those impacts of yoke 44 which are delivered directly upon the rubber button or cushion 58. Other functions of the cushion receiver-seat 59 are to lend a pleasing appearance to the forward upper portion of the spring fork mechanism and to prevent untimely distortion of the rubber button or cushion 58 under repeated impacts by yoke 44 and the forward end of sleeve 49.

The button or cushion 58 is preferably formed from a fairly good grade of soft rubber which in character is much like the rubber commonly found in rubber heels or tire treads. The rearwardly presented face of rubber button or cushion 58 is preferably recessed as at 60 for the reception of the shoulder or nut portion 51 of sleeve 49 when the latter is in the position of Figs. 1, 2, 9 and 10, or in the position of Fig. 8. Figs. 1, 2, 9 and 10, of course, show the several elements of the spring fork mechanism in the positions which they normally assume when the bicycle is not sustaining the weight of a rider, whereas in Fig. 8 the parts shown are in the positions which they assume when the rubber button or cushion 58 is under maximum compression, i. e., with the bicycle in motion and the fore-wheel brake applied.

When the bicycle is sustaining the weight of a rider of approximately the weight for which the spring fork mechanism has been adjusted, the several parts of such mechanism occupy the relative positions depicted in Fig. 4, i. e., with yoke 44 and sleeve 49 moved rearwardly away from rubber button or cushion 58 and with spring 54 substantially compressed but with its contiguous convolutions still out of contact. In this relationship of the parts shocks encountered by the front wheel which tend to move the lower ends of the fork members 12 forwardly, and, of course, the upper ends of such fork members rearwardly, are effectively cushioned by spring 54. In this relationship of the parts, as in all others, any turning of the fork members 12 to change the direction of the bicycle, is automatically accompanied by appropriate turning of collar 35, lug 36, and cushion arbor 37 and parts carried thereby, to keep the cushioning elements in proper relation to the upper ends of the fork members. This is so because the sturdy collar 17 (to which the intermediate portions of the fork members 12 are pivoted for movement on the horizontal axis) and the collar 35, are both secured to the steering tube 18 which, by manipulation of the handle bar, is turned in the steering head 10 in the usual manner.

Figure 3:
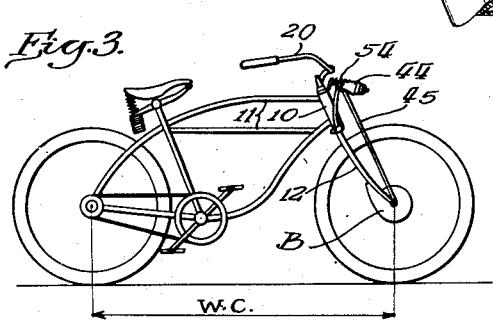
Fig. 3 is a diagrammatic illustration (intended for comparison with the generally similar diagrammatic illustrations of Figs. 5 and 7), which may be regarded as representative of a bicycle, having the spring fork mechanism of the present invention, as it appears when not sustaining the weight of a rider.

In the diagrammatic illustrations of Figs. 3, 5 and 7, the distance W—C is the one which exists between wheel centers when the several parts of the spring fork mechanism are in the positions which they occupy when the bicycle is not sustaining the weight of a rider. By reference to Fig. 5 it will be noted that the distance between wheel centers is substantially greater than the distance W—C when the bicycle is sustaining the weight of a rider. And by reference to Fig. 7 it will be noted that the distance between wheel centers again increases when the several parts of the spring fork mechanism attain the positions depicted in Fig. 6.

The several parts of the spring fork mechanism assume the positions depicted in Fig. 6 when the bicycle is braked at the rear wheel, e. g., as with a conventional coaster brake (not shown). As the rear wheel and bicycle frame slow down, pursuant to rear wheel braking, the inertia of the front wheel causes it to proceed forwardly, for a moment, at a speed greater than the forward speed of the bicycle frame 11. At this time the fork members 12 turn, on the axis represented by bolt 14, to carry the upper ends of such fork members, and the yoke 44, rearwardly further to compress spring 54, as shown in Fig. 6. Thus spring 54 yieldingly counteracts the said tendency of the front wheel to move ahead away from the bicycle frame pursuant to rear wheel braking—the several parts of the spring fork mechanism quickly reassuming the normal riding positions of Fig. 4 as soon as the forward speed of the front wheel has been slowed down to the forward speed of frame 11.

The several parts of the spring fork mechanism assume the several positions shown in Fig. 8 (being substantially the positions of Figs. 1, 2, 3, 9 and 10 except perhaps for a somewhat greater degree of compression of rubber buttons 58 than is depicted in such last mentioned figures) whenever the fore-wheel brake B is applied during forward travels of the bicycle.

When the front wheel is braked the yoke 44 and sleeve 49 impact rubber button or cushion 58 as the immediate consequence of (a) the forward momentum of the bicycle frame, rear wheel and rider, (b) the tendency of the braked front wheel to hold back the lower ends of the fork members, and (c) the energy stored in spring 54. The impacted rubber button or cushion 58, in such circumstances, acts to thwart any abrupt shock which might disturb the balance of the rider and at the same time tends to minimize vibratory movements, between spring fork and bicycle frame, detrimental to smooth action of the fore-wheel brake. A spring substituted for rubber button or cushion 58 would, inevitably, amplify such vibratory movements.

Having thus illustrated and described a preferred embodiment of my invention I wish to avail myself of all equivalent embodiments of such invention as defined by the appended claims.

What I claim as new and desire to secure by United States Letters Patent is:

1. In a bicycle and in combination with the steering post thereof, a front fork structure which is dirigible with the steering post and pivotally connected with the lower end of the steering post for movements on a horizontal axis, such fork structure comprising arms which extend upwardly and forwardly from the horizontal axis of said fork structure, a yoke connecting the upper portions of said arms, said yoke having an opening in its forward wall and a rigid sleeve extending rearwardly from said opening, a cushion arbor carried by and movable with the upper end of the steering post, said cushion arbor being of materially less diameter than said opening and sleeve so as to extend freely therethrough and beyond the forward wall of said yoke, such cushion arbor supporting a coiled spring at its rear end, the forward end of said spring surrounding said sleeve and having a mounting thereon so as to oppose rearward movements of the aforesaid arms, and a rubber button at the forward end of the cushion arbor, said button having a rearwardly extending cup-shaped portion of materially greater diameter than the opening through said yoke wall so as to elastically engage with said yoke outwardly of said opening when the yoke is forced forwardly by the coiled spring.

2. In combination with a bicycle steering head, a steering post, a front fork structure which is pivotally connected with the steering post at the lower portion of the steering head so as to be dirigible with the steering post and movable relatively to the steering post on a horizontal axis, said fork structure extending upwardly beyond its connection with the steering post, a yoke connecting the upper ends of said fork structure and having a sleeve extending therethrough, a cushion arbor connected to and movable with the steering post at the upper portion of the steering head, a coiled spring carried at its inner end on the cushion arbor and at its outer end on the inner end portion of said sleeve and cooperating therewith to oppose rearward movements of the upper portion of the fork structure, a frusto-conical rubber button adapted to seat over and radially engage the forward end portion of said sleeve, and a frusto-conical cushion-receiver seat on the forward end of the cushion arbor which normally holds said button coaxially with the sleeve and cushion arbor and out of engagement therewith, said rubber button being adapted to be impacted by the yoke and sleeve to compress the rubber of the button longitudinally and radially within said seat when the yoke is thrown toward the forward end of said cushion arbor.

3. In a bicycle and in combination with the steering post thereof, a front fork structure which is dirigible with the steering post and pivotally connected with the lower end of the steering post for movements on a horizontal axis, such fork structure comprising arms which extend upwardly and forwardly from the horizontal axis of said fork structure, a U-shaped yoke having its legs connected with the upwardly extending arms of the fork structure and having an aperture in its web portion, a headed sleeve fitted into the aperture in the web of said yoke so as to extend inwardly therefrom, a cushion arbor of materially less diameter than that of said sleeve carried by and movable with the upper part of the steering post and extending through the sleeve in the web of the yoke, a coiled spring supported at its rear end by the cushion arbor and at its forward end on said sleeve so as to oppose rearward movements of the yoke, a receiver seat mounted on the forward end of the arbor outwardly of the head of said sleeve, and an apertured rubber button through which the arbor extends, said button frictionally supported by the receiver seat out of engagement with the arbor and having a recessed inner face adapted to seat on the web of said yoke and to embrace the head of said sleeve when said yoke is moved forwardly to engage said button.

FRANK W. SCHWINN.